United States Patent
Xu et al.

(10) Patent No.: US 11,539,432 B1
(45) Date of Patent: *Dec. 27, 2022

(54) SYSTEMS AND METHODS FOR SKEW DETECTION AND PRE-COMPENSATION IN A COHERENT OPTICAL SYSTEM

(71) Applicant: CABLE TELEVISION LABORATORIES, INC., Louisville, CO (US)

(72) Inventors: Mu Xu, Broomfield, CO (US); Luis Alberto Campos, Superior, CO (US); Haipeng Zhang, Broomfield, CO (US); Junwen Zhang, Broomfield, CO (US); Zhensheng Jia, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,905

(22) Filed: Aug. 30, 2021

Related U.S. Application Data

(63) Continuation of application No. 16/573,872, filed on Sep. 17, 2019, now Pat. No. 11,108,462.
(Continued)

(51) Int. Cl.
*H04B 10/079* (2013.01)
*H04B 10/54* (2013.01)
(Continued)

(52) U.S. Cl.
CPC ....... *H04B 10/07951* (2013.01); *H04B 10/27* (2013.01); *H04B 10/541* (2013.01); *H04B 10/613* (2013.01)

(58) Field of Classification Search
CPC .............. H04B 10/07951; H04B 10/27; H04B 10/541; H04B 10/613
(Continued)

(56) References Cited

U.S. PATENT DOCUMENTS 9,184,834 B1 * 11/2015 Zhang .............. H04B 10/50577
9,337,934 B1 * 5/2016 Agazzi .................. H04B 10/61
(Continued)

OTHER PUBLICATIONS

Nguyen et al; Blind transmitter IQ imbalance Compensation in M-QAM Optical coherent systems; Sep. 2017; J.OPT. communication network; pp. 1-9. (Year: 2017).*
(Continued)

*Primary Examiner* — Amritbir K Sandhu
(74) *Attorney, Agent, or Firm* — Armstrong Teasdale LLP

(57) ABSTRACT

A skew compensation system for a coherent optical communication network includes a transmitter modulator having a first driver input for receiving a first signal from a first channel, a second driver input for receiving a second signal from a second channel, a source input for receiving a continuous wave source signal, and a modulation output in communication with an optical transport medium of the network. The system further includes a tunable delay line disposed between the second channel and the second driver input for inserting a pre-determined training sequence onto the second signal prior to the second driver input, and a processor for determining a skew amount between the second signal at the second driver input and the first signal at the first driver input, calculating a pre-compensation value corresponding to the skew amount, and reducing the skew amount at the modulation output according to the pre-compensation value.

20 Claims, 6 Drawing Sheets

Related U.S. Application Data

(60) Provisional application No. 62/732,126, filed on Sep. 17, 2018.

(51) Int. Cl.
*H04B 10/61* (2013.01)
*H04B 10/27* (2013.01)

(58) Field of Classification Search
USPC .......................................................... 398/25
See application file for complete search history.

(56) References Cited

U.S. PATENT DOCUMENTS

| | | | | |
|---|---|---|---|---|
| 9,735,881 B1* | 8/2017 | Agazzi | .................... | H04B 10/61 |
| 9,838,131 B1* | 12/2017 | Voois | ................. | H04B 10/2507 |
| 10,110,318 B2* | 10/2018 | Streshinsky | ......... | H04B 10/615 |
| 11,108,462 B2* | 8/2021 | Xu | ........................ | H04B 10/077 |
| 11,223,421 B1* | 1/2022 | Xu | ......................... | H04B 10/58 |
| 2019/0326998 A1* | 10/2019 | Chen | .................... | H04L 27/2096 |
| 2020/0052795 A1* | 2/2020 | Morie | ............... | H04B 10/07951 |

OTHER PUBLICATIONS

Zhu et al; Imbalanced Mach-Zehnder Modulator for Fading suppression in Dispersion-Uncompensated Direct Detection System; Nov. 2021; MDPI, pp. 1-17. (Year: 2021).*

* cited by examiner

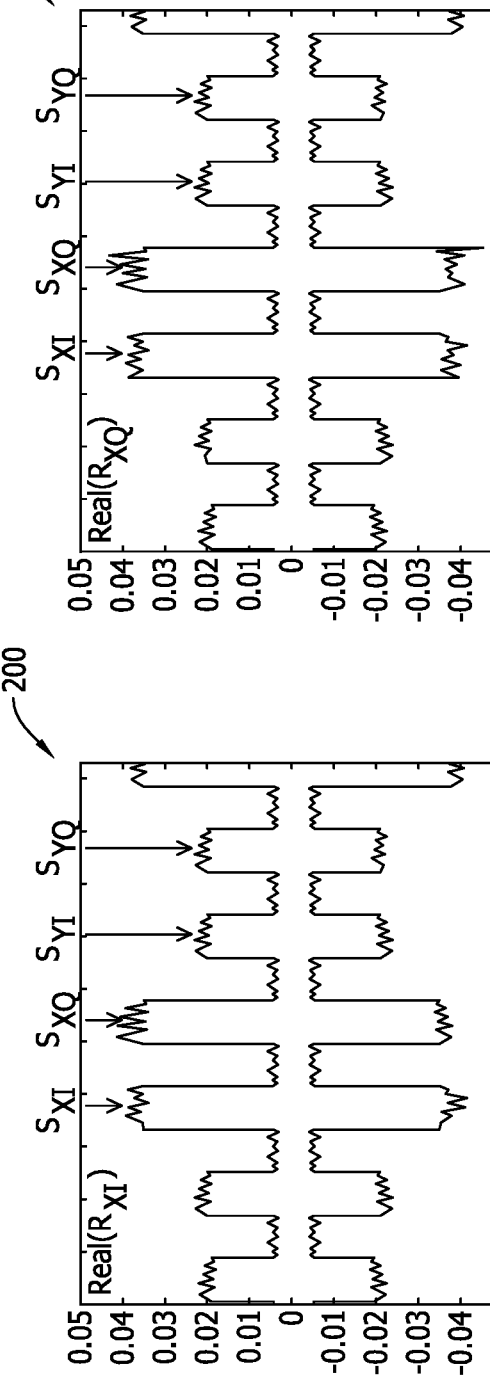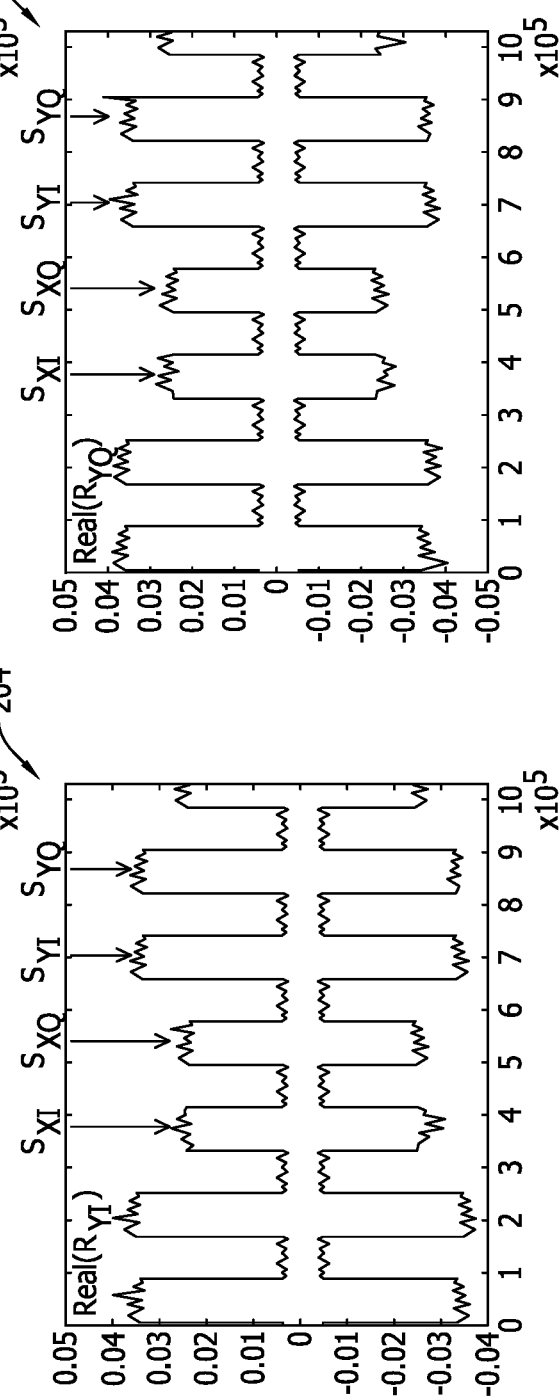
FIG. 2A  FIG. 2B  FIG. 2C  FIG. 2D

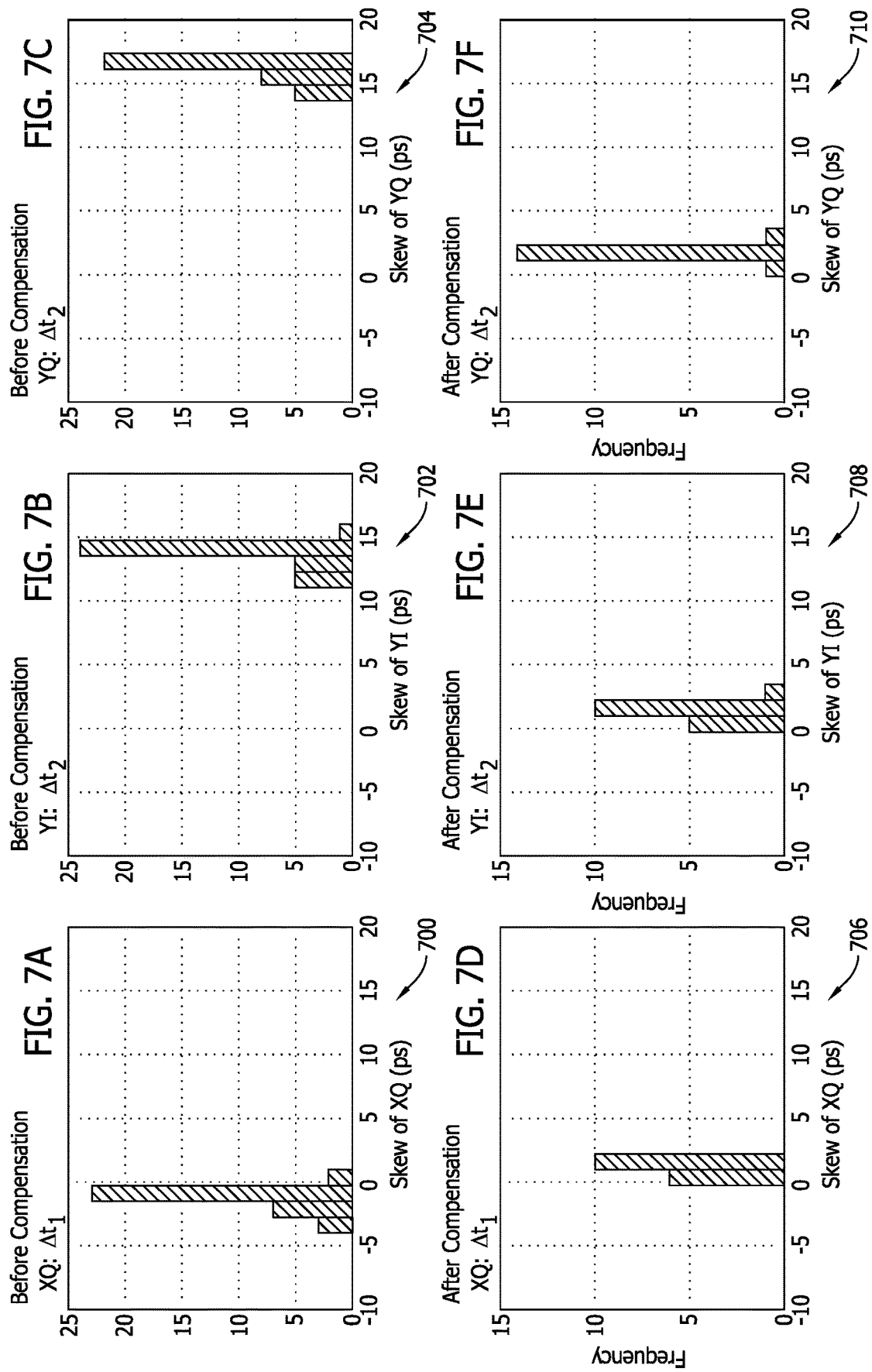

SYSTEMS AND METHODS FOR SKEW DETECTION AND PRE-COMPENSATION IN A COHERENT OPTICAL SYSTEM

CROSS REFERENCE TO RELATED APPLICATIONS

This application is a continuation of U.S. patent application Ser. No. 16/573,872, filed Sep. 17, 2019. U.S. patent application Ser. No. 16/573,872 claims the benefit of and priority to U.S. Provisional Patent Application Ser. No. 62/732,126, filed Sep. 17, 2018. Both of these applications are incorporated herein by reference in its entirety.

BACKGROUND

The field of the disclosure relates generally to fiber communication networks, and more particularly, to coherent optical networks exhibiting skew or sampling timing offset.

Telecommunications networks include an access network through which end user subscribers connect to a service provider. Bandwidth requirements for delivering high-speed data and video services through the access network are rapidly increasing to meet growing consumer demands. At present, data delivery over the access network is growing by gigabits/second (Gb/s) for residential subscribers, and by multi-Gb/s for business subscribers. Many conventional access networks are now based on passive optical network (PON) access technologies, which have become the dominant system architecture to meet the growing high capacity demand from end users in optical transport networks (OTNs). Some conventional PON architectures include Gigabit PON (GPON) and Ethernet PON (EPON) architectures, and time and wavelength division multiplexing (TWDM and WDM) have been recently been standardized in the conventional PON. A growing need therefore exists to develop higher/faster data rates per-subscriber to meet future bandwidth demand, but while also minimizing the capital and operational expenditures necessary to deliver higher capacity and performance access networks.

Conventional coherent PONs have recently led to an increase in both receiver sensitivity and overall capacity for WDM-PON optical access networks, in both brown and green field deployments. In the downlink (DL) of the conventional PON, an optical line terminal (OLT) is typically disposed at the headend, central office, and/or hub, and in the uplink (UL) of the PON, an optical network unit (ONU) is typically disposed at the location of an end user. Although both the OLT and the ONU typically have both transmitter and receiver capabilities, the OLT is sometimes referred to as the "transmitter end" of the PON, and the ONU is thus sometimes referred to as the "receiver end." Exemplary coherent PON architectures are taught in U.S. Pat. No. 9,912,409, issued Mar. 6, 2018, the disclosure of which is incorporated by reference herein.

The recent development of digital coherent optical systems and algorithms in long-haul transmission links significantly increased the capacity of next-generation (NG) optical transport networks (OTNs). Recent proposals to boost the OTN bit rate to support future bandwidth-hungry services (e.g., 5G enhanced mobile broadband (eMBB), virtual reality (VR), etc.) include new coherent optical communication standards based on 200 Gb/s (200G) and 400 Gb/s (400G). For the 400G systems, 64-Gbaud dual-polarization using 16-quadrature amplitude modulation (16-QAM) formats and greater are under consideration (as well as 40-GBaud 64-QAM. However, such high-order QAM formats and high baud rates negatively impact the system performance of the PON due to penalties from skew and sampling timing offset. For example, in a 64-Gbaud coherent system, which is significantly more stringent than a conventional 28-Gbaud 100G system, a 3-ps timing mismatch, or skew, between the in-phase (I) and quadrature (Q) components may result in an approximately 5.5 ppts degradation in the error vector magnitude (EVM), and a 5-ps skew would cause a complete clock walk-off. Accordingly, there is a need to address these skew and timing offset problems for high-speed, high-format order coherent PONs.

BRIEF SUMMARY

In an embodiment, a skew compensation system for a coherent optical communication network includes a transmitter modulator having (i) a first driver input configured to receive a first signal from a first channel, (ii) a second driver input configured to receive a second signal from a second channel, (iii) a source input configured to receive a continuous wave source signal, and (iv) a modulation output in operable communication with an optical transport medium of the coherent optical communication network. The system further includes a first tunable delay line disposed between the second channel and the second driver input, and configured to insert a pre-determined training sequence onto the second signal prior to the second driver input, and a processor configured to (i) determine a first skew amount between the second signal at the second driver input and the first signal at the first driver input, (ii) calculate a first pre-compensation value corresponding to the first skew amount, and (iii) reduce the first skew amount at the modulation output according to the first pre-compensation value.

In an embodiment, a method of detecting skew in a multi-lane coherent optical system is provided. The method includes steps of configuring individual payload data for each of four channels in the multi-lane coherent optical system, and inserting (i) a first training sequence in the first channel at a first time slot prior to the payload data of a first channel of the four channels, (ii) a second training sequence in the second channel at a time slot prior to the payload data of a second channel of the four channels, (iii) a third training sequence in the third channel at a third time slot prior to the payload data of a third channel of the four channels, and (iv) a fourth training sequence in the fourth channel at a fourth time slot prior to the payload data of a fourth channel of the four channels. The first, second, third, and fourth time slots do not overlap in time. The method further includes steps of calculating a modulus of each training sequence, searching a maxima value of each calculated modulus, obtaining time positions of the determined maxima values, and determining a skew value for each of the second, third, and fourth channels with respect to the first channel.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 2A-D are graphical illustrations of received component waveform plots taken over time for the respective training patterns depicted in FIG. 1.

FIGS. 7A-F are graphical illustrations of skew distribution histograms, in accordance with the embodiments described herein.

Figure 1:
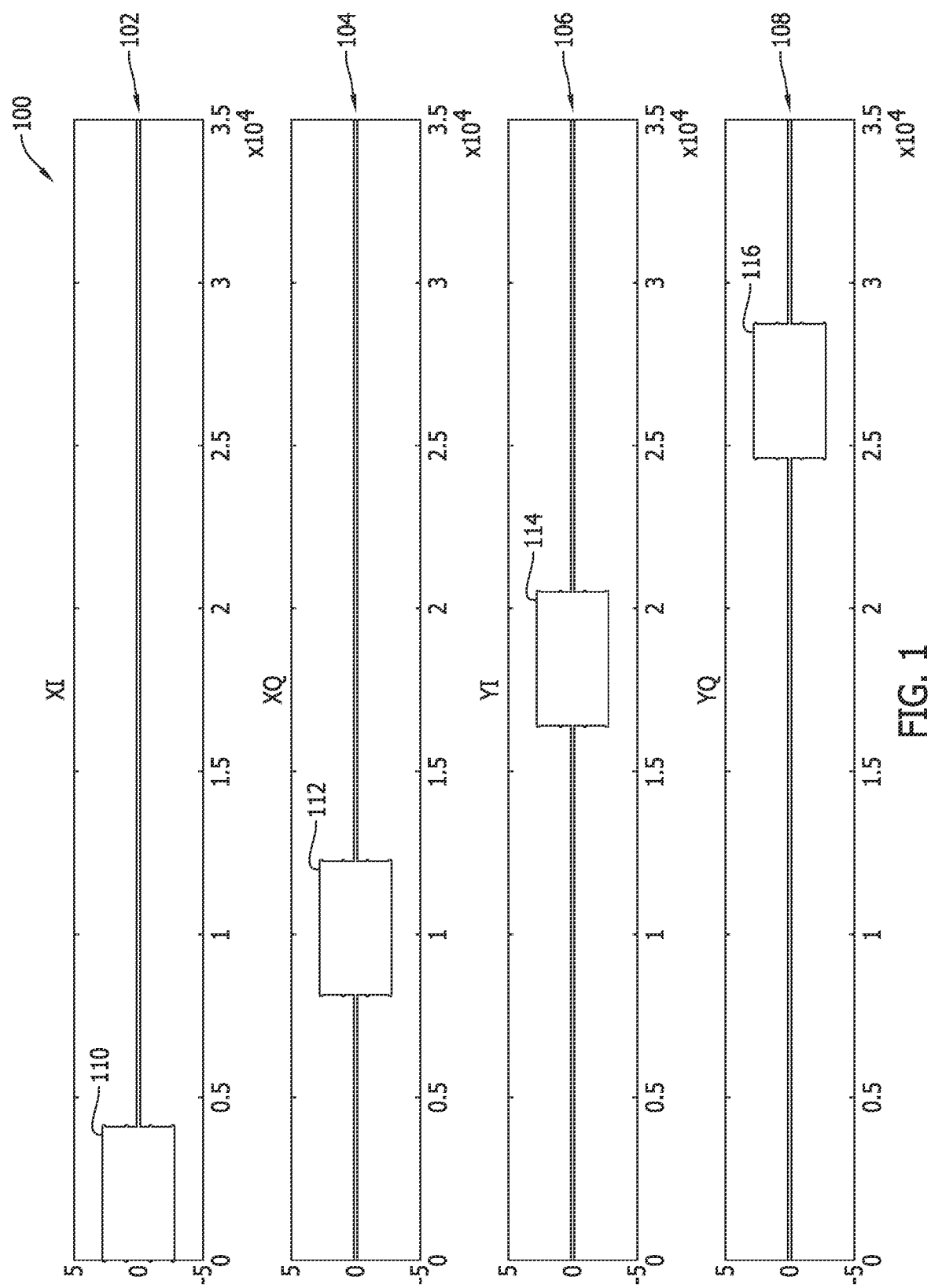
FIG. 1 is a graphical illustration of a composite training pattern plot in accordance with an exemplary embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The systems and methods described herein address and solve the conventional high-speed/high-format order challenges, described above, through a novel multi-lane skew detection process and pre-compensation unit that are based on modulus cross-correlation and frequency-domain time tuning. The skew detection and pre-compensation techniques of the present embodiments thus effectively suppress the penalties seen according to conventional proposals due to the timing mismatch or skew, and particularly in the transmitter initialization process (e.g., of the MTS, modem, etc.). In some embodiments, skew detection is implemented by a processor of the MTS (or modem). In other embodiments, skew detection may be implemented by a separate functional unit in operable communication with the respective transmitter. Similarly, the pre-compensation unit may be integral to the hardware and/or programming of the respective transmitter, or may be a separate unit.

Dual-Polarization, Multi-Lane Coherent System Operation

In a typical coherent system optical system implementing dual-polarization, each sample of a transmitted signal, S, is de-composed into a four-dimension vector having two orthogonal polarizations (e.g., in the X- and Y-directions) and two quadrature phases (e.g., I and Q components). Thus the four-dimensional vector signal S may be expressed as:

$$\hat{S} = \begin{pmatrix} S_{XI} + jS_{XQ} \\ S_{YI} + jS_{YQ} \end{pmatrix}. \quad \text{(Eq. 1)}$$

At a receiver site, a received signal sample, R, may then be expressed according to:

$$\hat{R} = \begin{pmatrix} R_{XI} + jR_{XQ} \\ R_{YI} + jR_{YQ} \end{pmatrix} = H\hat{S} = \begin{pmatrix} H_{xx} & H_{xy} \\ H_{yx} & H_{yy} \end{pmatrix} \begin{pmatrix} S_{XI} + jS_{XQ} \\ S_{YI} + jS_{YQ} \end{pmatrix}, \quad \text{(Eq. 2)}$$

where H represents the channel transfer matrix in consideration of the rotation of the polarizations. From Eq. 1 and Eq. 2, the following may be further deduced:

$$R_{XI} = \text{real}[H_{xx}(S_{XI}+jS_{XQ})+H_{xy}(S_{YI}+jS_{YQ})] \quad \text{(Eq. 3)}$$

$$R_{XQ} = \text{imag}[H_{xx}(S_{XI}+jS_{XQ})H_{xy}(S_{YI}+jS_{YQ})] \quad \text{(Eq. 4)}$$

$$R_{YI} = \text{real}[H_{yx}(S_{XI}+jS_{XQ})+H_{yy}(S_{YI}+jS_{YQ})] \quad \text{(Eq. 5)}$$

$$R_{YQ} = \text{imag}[H_{yx}(S_{XI}+jS_{XQ})H_{yy}(S_{YI}+jS_{YQ})]. \quad \text{(Eq. 6)}$$

Therefore, it may be observed, according to Eq. 3 through Eq. 6, how the skews from each polarization/phase will be spread across the four channels of the four-dimensional transmitted signal, and then re-combined at the receiver site. Accordingly, it has been conventionally challenging to extract the initial skew value for every one of the individual channels. This challenge is overcome according to the principles described further herein.

FIG. 1 is a graphical illustration of a composite training pattern plot 100. In an exemplary embodiment, plot 100 represents the operation of four separate channels 102, 104, 106, 108 used for transmission of the individual polarization/phase components of the four-dimensional vector signal Ŝ (e.g., a sample portion thereof, at the MTS (not shown in FIG. 1)). More particularly, plot 100 illustrates an exemplary scheme for inserting a training pattern as a period of training symbols 110, 112, 114, 116 into each of channels 102, 104, 106, 108, respectively, of the multi-lane configuration before commencing the transmission of the respective payload of the particular channel.

According to this technique, the respective one-dimensional signals $S_{XI}$, $S_{XQ}$, $S_{YI}$, $S_{YQ}$ of each of channels 102 (e.g., channel XI), 104 (e.g., channel XQ), 106 (e.g., channel YI), 108 (e.g., channel YQ) receives a different training pattern 110, 112, 114, 116 in front of that channel payload. In an exemplary embodiment, each training pattern 110, 112, 114, 116 is a known sequence of symbols that is inserted within a selected timeslot does not overlap the other training patterns in time. As depicted in FIG. 1, training patterns 110, 112, 114, 116 are illustrated to be substantially similar to one another, and only differ with respect to the timeslot into which the training sequence of symbols is inserted. In some embodiments, the training patterns are different.

In exemplary operation, training patterns 110, 112, 114, 116 are inserted before the payload by the respective transmitter (e.g., MTS or OLT in the DL, modem or ONU in the UL) which is sending signal Ŝ. At the receiver site thereto (e.g., at the opposite end of an optical transport medium/optical fiber, not shown in FIG. 1), within each particular time slot defined at the transmitter side, the waveform R̂ received at the receiver side will only contain the information from one dimension of the sent waveform. That is, according to this technique, the respective one-dimensional signals $S_{XI}$, $S_{XQ}$, $S_{YI}$, $S_{YQ}$ are therefore easily separated into different time slots, which significantly eases the process of obtaining and determining the skew of four channels (described further below) without interference from the other one-dimensional signals.

In an exemplary embodiment, a processor or processing element of the respective transmitter is programmed to insert the training patterns 110, 112, 114, 116 before the channel payloads, as described above. In other embodiments, a dedicated hardware or software module may be separately integrated within the transmitter, or may be separate from, but in operational communication with, the transmitter. In the exemplary embodiment, training pattern scheme of FIG. 1 is implemented with respect to dual-polarization/quadrature optical transmission over a PON architecture. In an embodiment, the training patterns are configured according to a data over cable service interface specification (DOCSIS) using a QAM format.

FIG. 2A-D are graphical illustrations of received component waveform plots 200, 202, 204, 206, respectively, taken over time for respective training patterns 110, 112, 114, 116, FIG. 1. More particularly, waveform plot 200 represents the received component corresponding to $R_{XI}$, waveform plot 202 represents the received component corresponding to $R_{XQ}$, waveform plot 204 represents the received component corresponding to $R_{YI}$, and waveform plot 206 represents the received component corresponding to $R_{YQ}$. Plots, 200, 202, 204, 206 therefore represent the received training patterns that the different channels.

Accordingly, as illustrated in FIG. 2, for each one of the four received components $R_{XI}$, $R_{XQ}$, $R_{YI}$, $R_{YQ}$, the waveform at different time slots correspond to the four different dimensions sent by the transmitter. According to this innovative technique, conventional peak-searching techniques may be implemented to find the starting position of $S_{XI}$, $S_{XQ}$, $S_{YI}$, and $S_{YQ}$. Moreover, the present techniques do not exclude conventional cross-correlation techniques. However, conventional cross-correlation may not be directly applied towards the received symbols themselves because, as illustrated in FIGS. 2A-2D, the received symbols are polluted by the phase noise and carrier frequency offset (CFO) resulting from the beating between the carrier light and optical local oscillator (LO).

Figure 3:
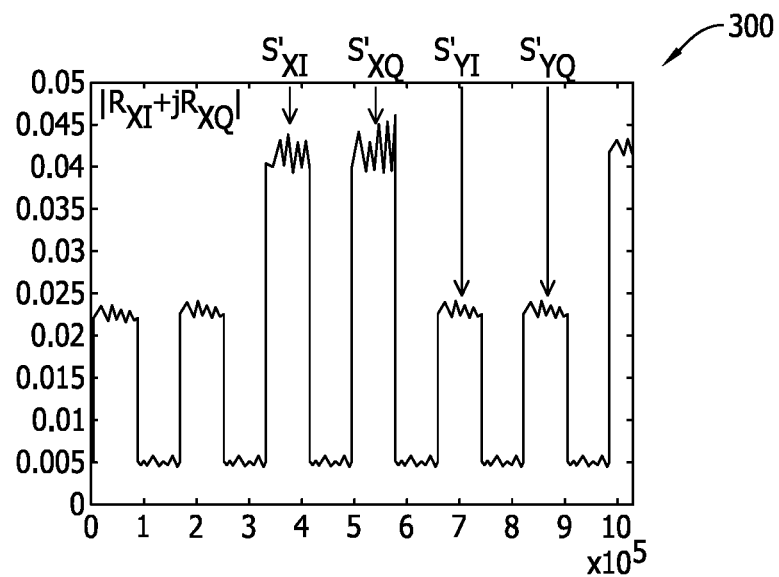
FIG. 3 is a graphical illustration depicting a plot of a modulus of a polarization complex signal.

FIG. 3 is a graphical illustration depicting a plot 300 of a modulus of polarization complex signal. More particularly, plot 300 graphically depicts the calculation of the modulus, or absolute value, of the received complex signal for each polarization. In the example illustrated in FIG. 3, for ease of explanation, only the received complex signal, i.e., $R_{XI}+jR_{XQ}$, for the X-polarization at the XI receiver channel (e.g., plot 200, FIG. 2A) is shown. Accordingly, one solution to the conventional cross-correlation challenges is to calculate the modulus/absolute value of the complex signal in each polarization (e.g., $R_{XI}+jR_{XQ}$), as shown by plot 300.

In the exemplary embodiment, it is desirable that the modulus of signal exhibits multi-level properties in order to determine the peaks in a cross-correlation process. Accordingly, in this example, a 4-level pulse amplitude modulation (PAM-4) format is implemented to generate the training symbols in each of the four dimensions. Therefore, after searching for the maxima value, the respective time positions of peaks for each of $S'_{XI}$, $S'_{XQ}$, $S'_{YI}$, and $S'_{YQ}$ (i.e., at the receiver side) may be obtained. These respective positions are labeled further herein as $t'_{XI}$, $t'_{XQ}$, $t'_{YI}$, and $t'_{YQ}$, respectively.

At the same time, the original starting times of $S_{XI}$, $S_{XQ}$, $S_{YI}$, and $S_{YQ}$ (i.e., from the transmitter side) may also be obtained, which are denoted further herein as $t_{XI}$, $t_{XQ}$, $t_{YI}$, and $t_{YQ}$, respectively. Accordingly, using the starting time $t_{XI}$ of $S_{XI}$ as a reference, the skew between XI and XQ (i.e., $\Delta t_1$, in this example), between XI and YI (i.e., $\Delta t_2$), and between XI and YQ (i.e., $\Delta t_3$) may be calculated according to:

$$\Delta t_1 = t'_{XQ} - t'_{XI} - (t_{XQ} - t_{XI}) \quad \text{(Eq. 7)}$$

$$\Delta t_2 = t'_{YI} - t'_{XI} - (t_{YI} - t_{XI}) \quad \text{(Eq. 8)}$$

$$\Delta t_3 = t'_{YQ} - t'_{XI} - (t_{YQ} - t_{XI}) \quad \text{(Eq. 9)}$$

Figure 4:
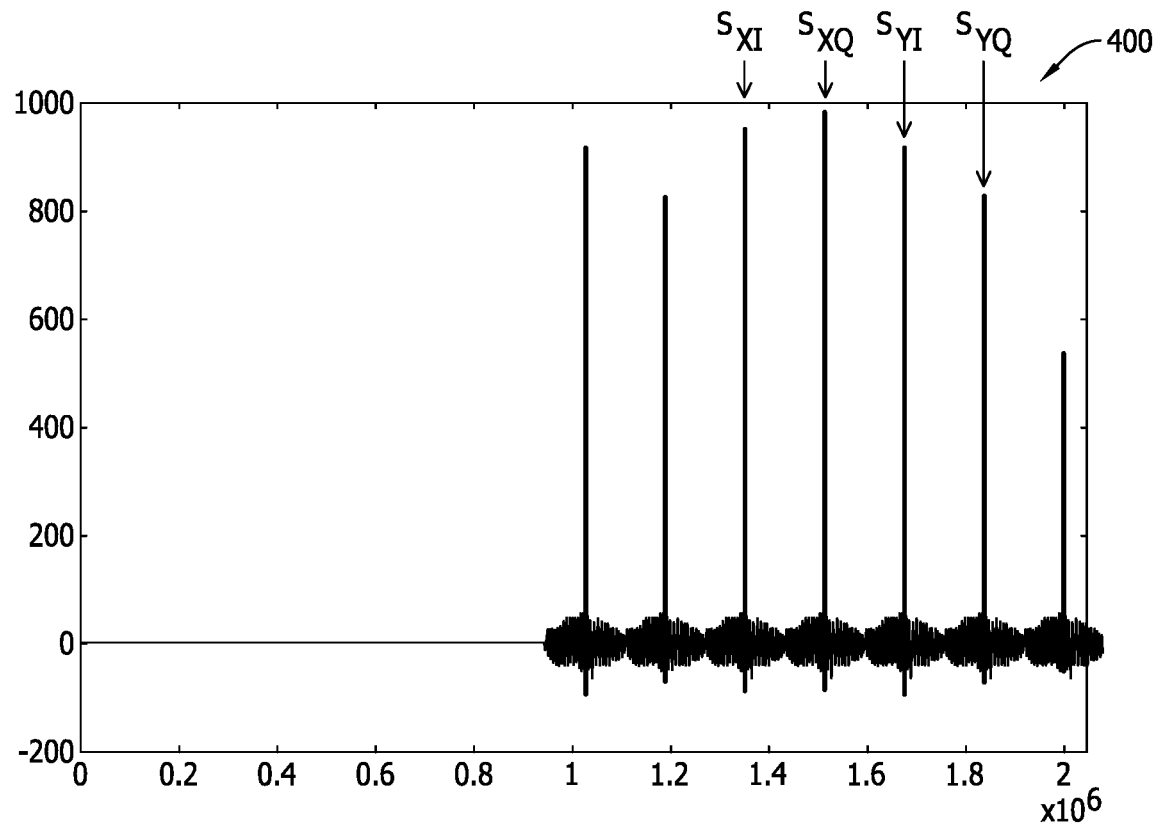
FIG. 4 is a graphical illustration of a comparative plot depicting a cross-correlation between received and sent training signals, in accordance with an embodiment.

FIG. 4 is a graphical illustration of a comparative plot 400 depicting a cross-correlation between received and sent training signals. In an exemplary embodiment, plot 400 depicts the cross-correlation between transmitted and received training signals after removal of the DC components thereof. More particularly, after removing the DC component, the disturbance from phase noise and CFO will be eliminated, and the time-domain cross-correlation profile of comparative plot 400 may be obtained. In this example, comparative plot 400 is illustrated as having strong, well-defined peaks. However, in the case where the signal is transmitted through a long-distance fiber (e.g., a single mode optical fiber, or SMF), the height of the peaks may be significantly weaker due to the spread of one signal pulse into adjacent pulses. In this case, it is desirable to implement a chromatic dispersion compensation subprocess prior to calculating the modulus of the signal.

Figure 5:
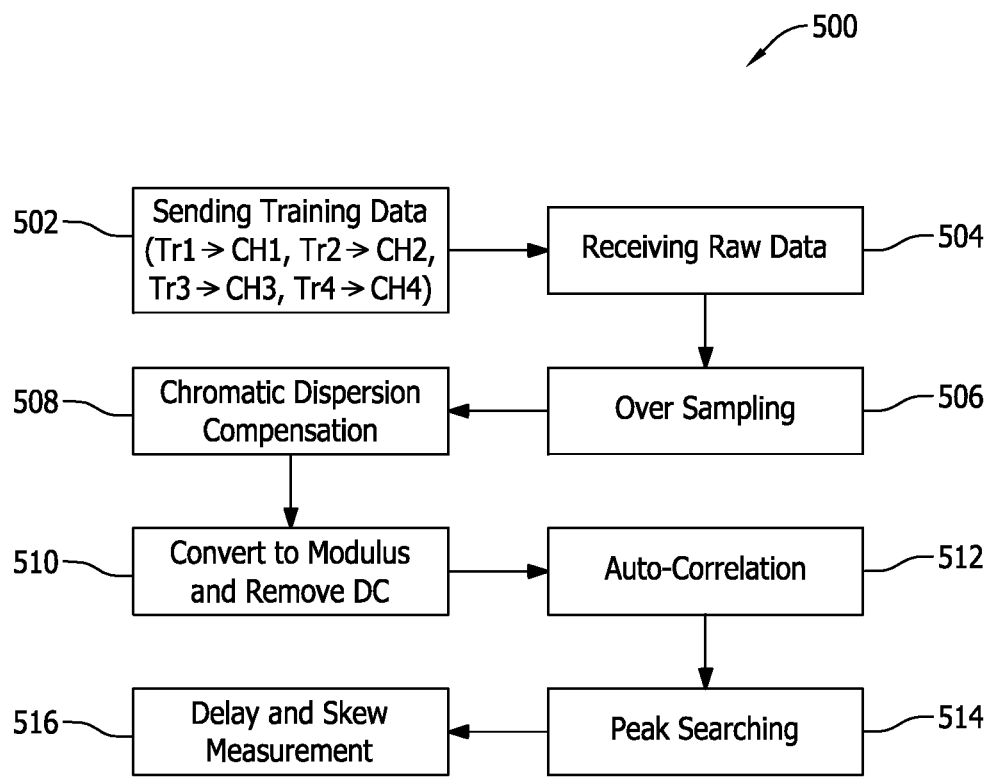
FIG. 5 is a schematic illustration depicting an exemplary detection process for peak searching in skew detection.

FIG. 5 is a schematic illustration depicting an exemplary detection process 500 for peak searching and skew detection. In an embodiment, process 500 is performed by one of the processors described above, and for a dual-polarization/phase 4 dimensional coherent optical signal. According to these exemplary techniques, the skew of all four channels in the coherent optical system may be reliably detected. In the exemplary embodiment, process 500 is implemented utilizing one or more of the principles described above.

Process 500 begins at step 502, in which training data (e.g., training patterns 110, 112, 114, 116, FIG. 1) is inserted into the transmitted signal data of the respective channels (e.g., 102/XI, 104/XQ, 106/YI, 108/YQ, FIG. 1). In step 504, the raw data of the transmitted signal, which includes the training data, is received by receiver in the DL. Step 506 is an optional step. In step 506, the raw data may be oversampled by an oversampling unit or module of, or in communication with, the receiver. Step 508 is also an optional step. In step 508, chromatic dispersion compensation is performed, such as in the case of a long-distance transmission over a long optical fiber, where the height of cross-correlation peaks may be weakened (e.g., plot 400, FIG. 4).

In step 510, the processed (e.g., oversampled, chromatic dispersion compensation, etc.) data is converted to the modulus and the DC component is removed. In an exemplary embodiment of step 510, removal of the DC component eliminates phase noise and CFO disturbance from the received signal. In step 512, and auto-correlation subprocess is performed on the modulus to obtain strong peaks (e.g., plot 400, FIG. 4), and in step 514 a peak searching algorithm obtains the maximum value to locate the respective time positions (e.g., $t'_{XI}$, $t'_{XQ}$, $t'_{YI}$, $t'_{YQ}$) of the several peaks (e.g., $S'_{XI}$, $S'_{XQ}$, $S'_{YI}$, $S'_{YQ}$, respectively) at the receiver. In step 516, a delay/skew measurement procedure is implemented to determine the skew for each of the several channels. In an exemplary embodiment of step 516, the measurement procedure implements one or more of the algorithms described above with respect to Eq. 7-9.

Figure 6:
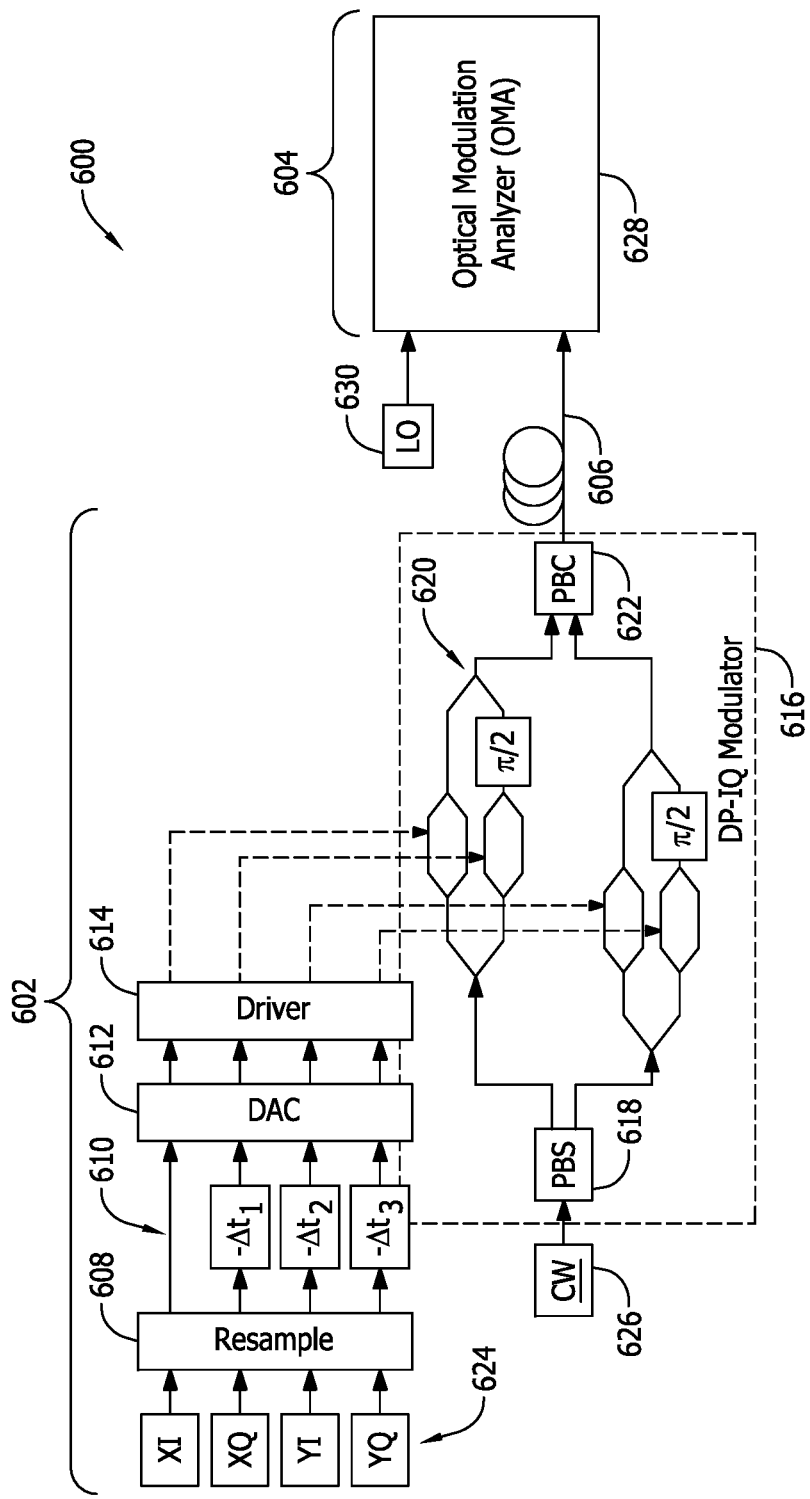
FIG. 6 is a schematic illustration depicting an exemplary skew pre-compensation system.

FIG. 6 is a schematic illustration depicting an exemplary skew pre-compensation system 600. In an exemplary embodiment, system 600 is implemented at the transmitter side (e.g., MTS or modem) to execute a skew pre-compensation scheme for each of the four channels in which the amount of skew has been determined (e.g., according to process 500, FIG. 5). In the example illustrated in FIG. 6, system 600 includes a transmitter side 602 in operable communication with a receiver side 604 over an optical transport medium 606 (e.g., an SMF). The person of ordinary skill in the art will understand that the several elements of system 600 that are illustrated in FIG. 6 are provided by way of illustration, and not in a limiting sense. For example, the elements shown within system 600 are not intended to be exhaustive, and the person of ordinary skill is apprised that other indication system network elements may be implemented in a complementary fashion with system 600, and without departing from the scope herein.

More particularly, in the exemplary embodiment illustrated in FIG. 6, system 600 represents a real-world experimental testing setup to demonstrate proof of the concepts of the principles described herein. In the experimental setup, transmitter side 602 included a sampling unit 608 (e.g., a resampling subprocessor), one or more delay units 610 (three delay units, and this example) a digital-to-analog converter (DAC) 612, a driver 614, and a modulator 616. In this setup, modulator 616 includes a polarization beam splitter (PBS) 618, a dual-polarization I/Q modulation unit 620 having a Mach-Zehnder modulation (MZM) architecture, and a polarization beam combiner (PBC) 622.

In exemplary operation of system 600, four channels 624 (i.e., XI, XQ, YI, YQ) are input to sampling unit 608, after which different time delays from delay units 610 are assigned to at least three of the channels 624, such that training signals inserted into each channel 624 will not overlap with one another in the time domain. The several time-delayed channels may then be processed by DAC 612 and output to modulation unit 620 of modulator 616, and where PBS 618 of modulator 616 receives a continuous wave source input 626. In further operation of system 600, receiver side 604 included an optical modulation analyzer (OMA) 628 for testing purposes, and OMA 628 was configured to be in communication with optical transport medium 606 and an LO source 630.

Using this configuration of system 600, a skew pre-compensation scheme was effectively achieved. That is, in further operation of system 600, after calculation of the skew values (e.g., according to process 500, FIG. 5), the mismatch(es) may be compensated utilizing system 600. More particularly, delay units 610 represent group of tunable delay lines that are inserted after a resampling procedure performed by sampling unit 608 for each of the four channels 624. In some embodiments, the several delays may be tuned or adjusted using cascaded flip-flop buffers or inverter chains in the IC design.

In other embodiments, such as in the case where the analog scheme is not available, delay tuning may be achieved digitally, for example, using fast Fourier transform (FFT) techniques. In this digital delay tuning embodiment of system 600, given that the original signal streams of the respective channels 624 are denoted as $S_{XI}$, $S_{XQ}$, $S_{YI}$, and $S_{YQ}$, the pre-compensated signal streams $\bar{S}_{XI}$, $\bar{S}_{XQ}$, $\bar{S}_{YI}$, and $\bar{S}_{YQ}$ may be calculated according to the following algorithms:

$$\bar{S}_{XI} = S_{XI} \quad\quad\quad\quad\quad (\text{Eq. 10})$$

$$\bar{S}_{XQ} = \text{ifft}[\text{fft}(S_{XQ})^* e^{j2\pi\omega(-\Delta t_1)}] \quad\quad (\text{Eq. 11})$$

$$\bar{S}_{YI} = \text{ifft}[\text{fft}(S_{YI})^* e^{j2\pi\omega(-\Delta t_2)}] \quad\quad (\text{Eq. 12})$$

$$\bar{S}_{YQ} = \text{ifft}[\text{fft}(S_{YQ}) e^{j2\pi\omega(-\Delta t_3)}]. \quad\quad (\text{Eq. 13})$$

Accordingly, in comparison with analog delay tuning schemes, this digital scheme is more accurate and flexible, but may also result in higher computing complexity and greater hardware costs to fully implement if additional processors are required.

Experimental results of skew detection process 500 and pre-compensation system 600 successfully verified the performance of the innovative techniques described herein. More particularly, for the experimental setup illustrated in FIG. 6, four pre-determined training symbols were generated and uploaded on XI, XQ, YI, and YQ channels 624, which were then modulated from a $2^{15}-1$ pseudorandom binary sequence (PRBS) having a sequence length of $2^{13}$. A PAM-4 format was applied on each training sequence, and each training sequence included 4096 4-level symbols. The training signals were then modulated onto DP-IQ modulator 616 at a baud rate of 40GSa/s, and then transmitted over a 75-km SMF length of optical transport medium 606. The transported signals were then captured by OMA 628 for subsequent offline signal processing. The experimental results were repeated for a large number of repeated experiments, and histogram distribution plots of the resulting skews, measured at OMA 628, are described further below with respect to FIG. 7.

FIGS. 7A-F are graphical illustrations of skew distribution histograms 700, 702, 704, 706, 708, 710, respectively. More particularly, in the exemplary embodiment histogram 700 depicts the skew of channel XQ with respect to channel XI prior to digital pre-compensation (e.g., according to system 600, FIG. 6), histogram 702 depicts the skew of channel YI with respect to channel XI prior to digital pre-compensation, and histogram 704 depicts the skew of channel YQ with respect to channel XI prior to digital pre-compensation. Similarly, histogram 706 depicts the skew of channel XQ with respect to channel XI after digital pre-compensation, histogram 708 depicts the skew of channel YI with respect to channel XI after digital pre-compensation, and histogram 710 depicts the skew of channel YQ with respect to channel XI after digital pre-compensation. In this example, no histogram is depicted for channel XI, since channel XI is used as the reference channel does not skew from itself.

As illustrated in the respective histograms depicted in FIGS. 7A-7F, it may be observed that, with respect to channel XI, prior to pre-compensation, the skew of channel XQ is approximately −1.25 ps, the skew of channel YI is approximately 13 ps, and the skew of channel YQ is approximately 15 ps. However, after implementation of the pre-compensation scheme described above with respect to FIG. 6, the skew of all three channels XQ, YI, YQ was reduced to approximately 1 ps, thereby validating the effectiveness of the systems and methods described herein. Accordingly, using the innovative techniques of the present embodiments, coherent optical systems are enabled to achieve faster data rates, and at higher modulation formats, without suffering from the skew and timing/CFO penalties that limit the conventional systems.

Exemplary embodiments of optical communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

As described above, the DOCSIS protocol may be utilized with one or more of the embodiments described herein. Additionally, the present embodiments may implement protocols such as EPON, RFoG, GPON, Satellite Internet Protocol, etc., without departing from the scope of the embodiments herein. The present embodiments are therefore particularly useful for communication systems and networks implementing a DOCSIS protocol, and may be advantageously configured for use in existing 4G and 5G networks, and also for NR and future generation network implementations.

Although specific features of various embodiments of the disclosure may be shown in some drawings and not in others, such illustrative techniques are for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processor (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also enables a person skilled in the art to practice the embodiments, including the make and use of any devices or systems and the performance of any incorporated methods. The patentable scope of the disclosure is defined by the claims, and may include other examples that occur to those skilled in the art.

Such other examples are intended to be within the scope of the claims if they have structural elements that do not differ from the literal language of the claims, or if they include equivalent structural elements with insubstantial differences from the literal language of the claims.

What is claimed is:

1. A skew compensation system for an optical communication network, comprising:
    a transmitter modulator including (i) a first driver input configured to receive a first signal from a first channel, (ii) a second driver input configured to receive a second signal from a second channel, (iii) a source input configured to receive a continuous wave source signal, and (iv) a modulation output in operable communication with an optical transport medium of the optical communication network;
    a first tunable delay line disposed between the second channel and the second driver input, and configured to insert a pre-determined training sequence onto the second signal prior to the second driver input;
    a sampling unit disposed (i) between the first channel and the first driver input, and (ii) between the second channel and the first tunable delay line; and
    a processor configured to (i) determine a first skew amount between the second signal at the second driver input and the first signal at the first driver input, (ii) calculate a first pre-compensation value corresponding to the first skew amount, and (iii) minimize the first skew amount at the modulation output according to the first pre-compensation value.

2. The skew compensation system of claim 1, wherein the transmitter modulator comprises a dual-polarization modulation unit in-phase (I)/quadrature (Q) modulation unit including a third driver input configured to receive a third signal from a third channel and a fourth driver input configured to receive a fourth signal from a fourth channel.

3. The skew compensation system of claim 2, further comprising (i) a second tunable delay line disposed between the sampling unit and the third driver input, and (ii) a third tunable delay line disposed between the sampling unit and the fourth driver input.

4. The skew compensation system of claim 3, wherein (i) the first channel includes the pre-determined training sequence at a first time slot prior to payload data of the first signal, (ii) the first tunable delay line is configured to insert the pre-determined training sequence onto the second signal at a second time slot that does not overlap the first time slot, (iii) the second tunable delay line is configured to insert the pre-determined training sequence onto the third signal at a third time slot that does not overlap the first and second time slots, and (iv) the third tunable delay line is configured to insert the pre-determined training sequence onto the fourth signal at a fourth time slot that does not overlap the first, second, and third time slots.

5. The skew compensation system of claim 2, wherein the transmitter modulator includes an X-polarization component, a Y-polarization component, an I-phase component, and a Q-phase component, and wherein the first signal includes XI data, the second signal includes XQ data, the third signal includes YI data, and the fourth signal includes YQ data.

6. The skew compensation system of claim 1, wherein the optical communication network comprises a passive optical network (PON) system architecture.

7. The skew compensation system of claim 6, wherein the PON system architecture is configured for communication according to a data over cable service interface specification (DOCSIS) protocol.

8. The skew compensation system of claim 7, wherein the first, second, third, and fourth signals conform to a quadrature amplitude modulation (QAM) format.

9. The skew compensation system of claim 7, wherein the first, second, third, and fourth signals conform to a 4-level pulse amplitude modulation (PAM4) format.

10. The skew compensation system of claim 1, wherein the transmitter modulator is disposed in at least one of a modem termination system (MTS) and a modem.

11. The skew compensation system of claim 10, wherein the MTS comprises an optical line terminal (OLT).

12. The skew compensation system of claim 10, wherein the modem comprises an optical network unit (ONU).

13. The skew compensation system of claim 4, further comprising a driver disposed between (i) the transmitter modulator, and (ii) the first channel and the first, second, and third tunable delay lines.

14. The skew compensation system of claim 13, further comprising a digital to analog converter (DAC) disposed between (i) the driver, and (ii) the first channel and the first, second, and third tunable delay lines.

15. The skew compensation system of claim 14, wherein the sampling unit is further disposed between the first channel and the DAC.

16. The skew compensation system of claim 4, wherein the transmitter modulator further comprises a polarization beam splitter disposed at the source input to receive the continuous wave source signal, and a polarization beam combiner at the modulation output.

17. A method of detecting skew in a dual-lane optical system, comprising the steps of:
    configuring individual payload data for a first channel and a second channel in the dual-lane optical system;
    inserting (i) a first training sequence in the first channel at a first time slot prior to payload data of the first channel, and (ii) a second training sequence in the second channel at a second time slot prior to payload data of the second channel, wherein the first time slot is orthogonal to the second time slot;
    calculating a modulus of each of the first and second training sequences;
    determining a maxima value of each respective calculated modulus of the first and second training sequences;
    obtaining time positions of the respective determined maxima values; and
    determining a skew value for the second channel with respect to the first channel.

18. The method of claim 17, further comprising, prior to the step of calculating, a step of compensating for chromatic dispersion in each of the first and second channels.

19. The method of claim 18, further comprising, prior to the step of compensating, a step of oversampling transmitted data in each of the first and second channels.

20. The method of claim 17, further comprising, prior to the step of calculating, a step of removing a DC component from each of the first and second channels.

* * * * *